Patented Jan. 1, 1924.

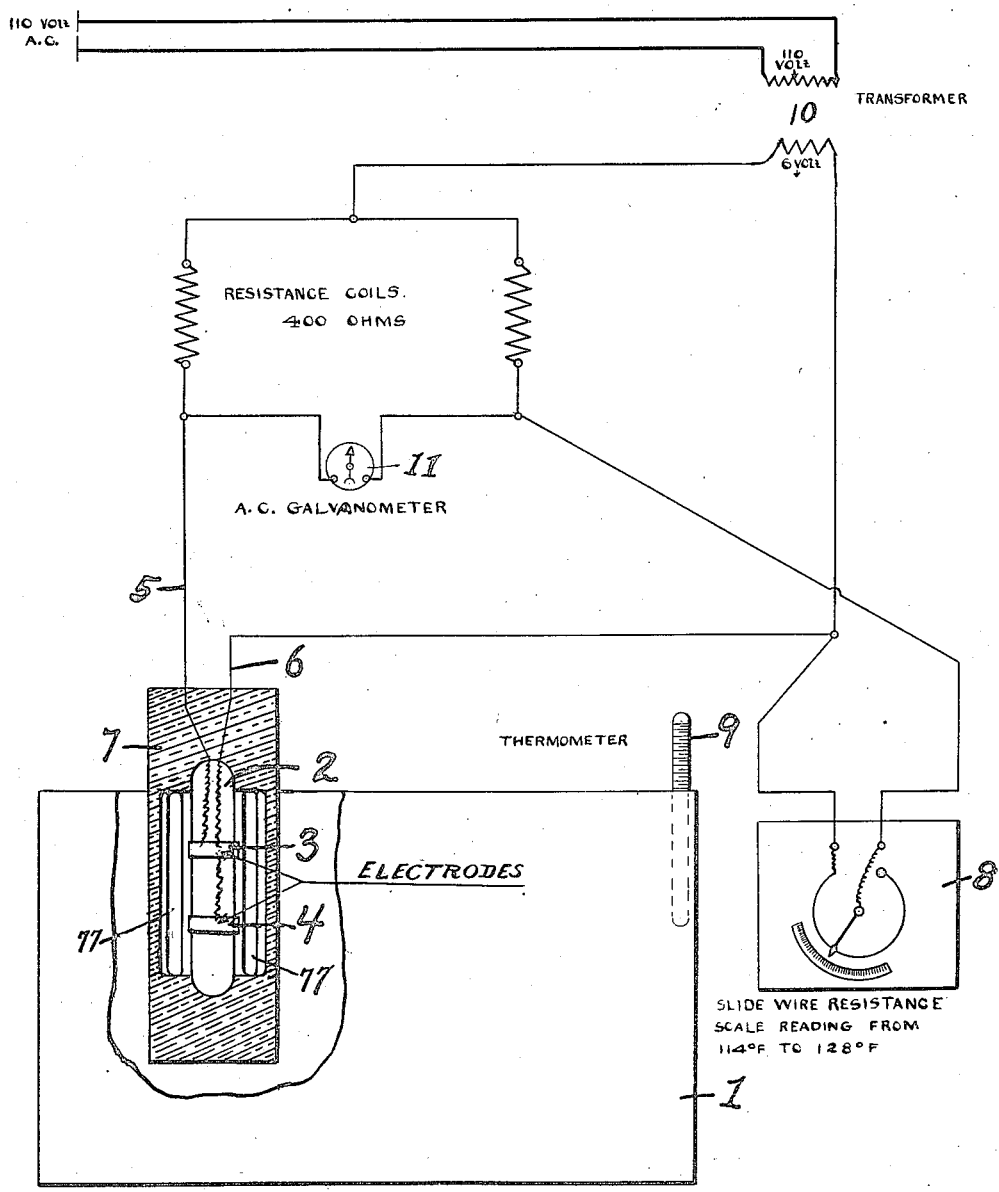

1,479,087

UNITED STATES PATENT OFFICE.

FRANK E. RICE, OF ITHACA, NEW YORK, ASSIGNOR TO NESTLE'S FOOD COMPANY, OF NEW YORK, N. Y., A CORPORATION OF NEW YORK.

METHOD OF DETERMINING FINISHING POINT IN PROCESS OF CONDENSING MILK.

Application filed August 21, 1919. Serial No. 318,895.

*To all whom it may concern:*

Be it known that I, FRANK E. RICE, a citizen of the United States, residing at Ithaca, in the county of Tompkins and State of New York, have invented certain new and useful Improvements in Methods of Determining Finishing Point in Processes of Condensing Milk; and I do hereby declare the following to be a full, clear, and exact description of the invention, such as will enable others skilled in the art to which it appertains to make and use the same.

This invention relates to a novel method and apparatus for determining the finishing point in the process of condensing milk.

All methods used previously for the determination of the finishing point in the process of condensing milk have been crude and have yielded inaccurate results. These methods have depended on, (1) the judgment of the operator in watching the boiling milk through a glass door, or by drawing a sample of the milk and examining the consistency with a spoon, (2) by determining the specific gravity of a drawn sample by use of a floating spindle or picnometer, (3) by determining the viscosity using a viscosimeter.

In order to obtain the slightest accuracy with any of these methods, it is necessary that the operator have long experience, and then under the most favorable conditions he cannot obtain consistently good results.

The method to be described can be carried out with as good results by an inexperienced operator as by an expert, and may be performed day after day consistently and accurately. Actual operation on a factory scale has proven this to be true.

As the process of condensing sweetened milk proceeds (i. e. as water is evaporated off), the product becomes increasingly resistant to the passage of electric current. By measuring the resistance it is possible to determine at what point the process should be stopped. This is accomplished by introducing electrodes in the form of metallic strips into the evaporating pan, which electrodes are submerged in the boiling milk. The current passes from one electrode through the milk to the other.

The behavior of unsweetened milk during the condensation is opposite to that of milk which has been sweetened, the resistance becomes less and less as the condensation proceeds. The desired point of condensation is reached in this case when a minimum resistance is obtained.

A suitable apparatus for carrying out the method is shown in the accompanying drawing, but it is to be understood that various changes in the construction and arrangement of parts may be made in the apparatus without departing from the spirit of the invention.

The drawing shows a diagrammatic view of the apparatus, and referring thereto, 1 represents an evaporating pan adapted to contain the milk undergoing condensation. Located within the pan is a rod 2 of porcelain or other non-conducting substance on which is mounted two spaced or separated electrodes in the form of metallic bands or strips 3 and 4. These bands are attached to current wires 5 and 6 which pass through the interior of the rod and thence to the outside of the pan. The metallic electrodes and the wires are carefully insulated from each other throughout. The passage of the current is along the wires to one metal electrode, through the milk and to the other electrode, and along its wires to the outside.

The electrodes are partly enclosed by an insulated cage 7 having perforations 77. This cage prevents the milk from moving too rapidly in the vicinity of the electrodes so that good electrical contact is made between the metal strip electrodes and the milk. The cage must be sufficiently open so that circulation of the milk from the outside is assured.

The wires leading to the outside run to an apparatus built upon the principle of a Wheatstone bridge.

On account of the fact that the process of condensation is not always ended at the same temperature and since the resistance of the milk varies with the temperature, it is necessary to compensate for this. This is effected by a slide wire resistance 8 located near a thermometer 9, that indicates the temperature of the milk. This resistance is to be continually set by the operator to correspond with the temperature indicated by the thermometer. Wires from the compensating device lead also to the Wheatstone bridge.

The source of current for all parts of the system may be any alternating current of low voltage which is not grounded. It is convenient usually to use the ordinary 60-cycle alternating current customarily found in lighting circuits. This current is passed through a small transformer 10 which at once "steps down" the current to the voltage desired, and since the secondary only is used, grounding is obviated.

When a system of wiring is arranged as shown in the drawing, no passage of current, as observed at the galvanometer 11, indicates that the resistance offered to the current by the milk at the pan attachment is equal to that of the slide wire resistance 8. When the needle of the galvanometer deflects, the resistances are unequal and by observing the direction of the deflection of the needle, knowledge is had of which is the greater resistance.

In operating the apparatus, the slide wire resistance 8, is set at the point of resistance which should be also the resistance of the milk, when it has reached the desired point of condensation. The resistance of the milk changes as the condensation progresses and the operator watches the galvanometer needle and when it come to the zero point, it indicates that the resistance of the milk has reached that of the slide wire.

As has already been mentioned, the required resistance of the finished milk is different at different temperatures. The slide wire is, therefore, to be set at points corresponding to the temperature at the time the observation is made.

The pan operator continually watches the thermometer 9 which shows the temperature of the boiling milk. He sets the slide wire to correspond and when the needle of the galvanometer indicates zero movement of current, the milk is considered finished.

I am aware that various changes and modifications may be made in my process and apparatus without departing from the spirit of the invention as defined by the claims.

What I claim and desire to secure by Letters Patent is:—

1. A method of determining the finishing point in condensing milk, which consists in passing an electric current through the milk and indicating the resistance offered to the current by said milk during condensation and at the finishing point.

2. A method of determining the finishing point in condensing milk, which consists in passing parallel electric currents through the milk and through a known resistance, and indicating the point at which the resistance offered to one of said currents by said milk at its finishing point is equal to the opposition offered by the resistance to the other of said currents.

3. A method of determining the finishing point in condensing milk, which consists in submerging two electrodes in the milk undergoing condensation, passing an electric current between said electrodes, and indicating the resistance offered to the current by the milk during condensation and at the finishing point.

4. A method of determining the finishing point in condensing milk, which consists in submerging two electrodes in the milk undergoing condensation, passing an electric current between said electrodes, also passing a current through a known resistance, and indicating the point at which the resistance offered to one of said currents by said milk at its finishing point is equal to the opposition offered by the resistance to the other current.

5. A method of determining the finishing point in condensing milk which consists in submerging two electrodes in the milk undergoing condensation, passing an electric current between said electrodes, also passing a current through an adjustable resistance, adjusting the resistance to accord with the temperature of the milk, and indicating the point at which the resistance offered to one of said currents by said milk during condensation and at the finishing point is equal to the opposition offered by the resistance to the other current.

6. An electrical apparatus for use in determining the finishing point in condensing milk including a plurality of known resistances, a galvanometer and an adjustable resistance all in operative electrical connection, an evaporating pan, an insulating member extending into said pan, and a plurality of spaced electrodes co-operating with said known resistances, galvanometer and adjustable resistance, and arranged on said member, said electrodes being designed to be submerged in the milk undergoing treatment whereby said milk will form a resistance between the electrodes and complete an electric circuit through said known resistances, galvanometer and adjustable resistance.

7. The method of determining the finishing point in the evaporative treatment of milk which consists in setting an electrical resistance at a predetermined point at which the resistance offered to electric current is equal to the resistance offered to electric current by the milk at its finishing point, passing an electric current through said milk while the same is undergoing treatment, also passing an electric current through said electrical resistance, and indicating when the resistance offered to one of said currents by the milk undergoing treatment at its finishing point is equal to the opposition offered by the electrical resistance to the other current.

In testimony whereof I affix my signature.

FRANK E. RICE.